United States Patent [19]

Korotenko et al.

[11] 3,858,447

[45] Jan. 7, 1975

[54] DEVICE FOR DETERMINING THE COMPOSITION OF A LIQUID-GAS MIXTURE IN THE COURSE OF MIXTURE PREPARATION

[76] Inventors: Boris Evdokimovich Korotenko; Vitaly Borisovich Korotenko, both of Armyansky pereulok, 1/3, kv. 15; Sergei Kuzmich Leschina, ulitsa Kosmonavtov, 5a, kv. 16, all of Kharkov, U.S.S.R.

[22] Filed: June 21, 1972

[21] Appl. No.: 265,001

[52] U.S. Cl. .................................. 73/196, 73/118
[51] Int. Cl. ...................... G01f 9/00, G01m 19/00
[58] Field of Search ........ 73/23, 196, 113, 114, 118

[56] References Cited
UNITED STATES PATENTS
1,747,536  2/1930  Aernout .............................. 73/196
2,526,635  10/1950  Cochran .............................. 73/196
3,392,579  7/1968  Westberg ............................ 73/196

*Primary Examiner*—Richard C. Queisser
*Assistant Examiner*—Anthony V. Ciarlante
*Attorney, Agent, or Firm*—Waters, Roditi, Schwartz & Nissen

[57] ABSTRACT

A device for determining the composition of a liquid-gas mixture in the course of mixture preparation comprising a gas flow sensing element and a liquid-gas mixture composition indicator having a chamber divided by a fixed and a movable partition into two cavities. One cavity communicates with a liquid stream directed to a liquid-gas mixture preparing unit being tested, while a circulating liquid stream is produced in the second cavity by means of a centrifugal pump whose impeller is driven by a shaft of a gas flow sensing element. The liquid streams set the movable partition in a position defining the liquid-gas mixture composition.

3 Claims, 3 Drawing Figures

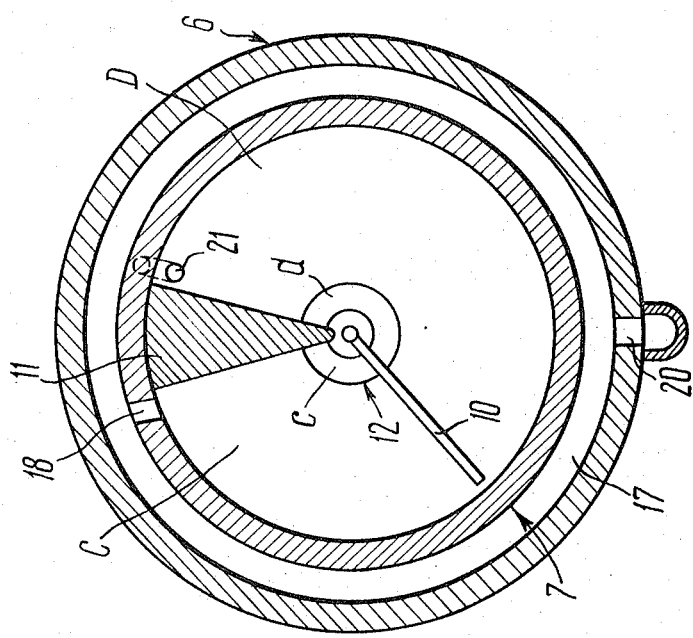
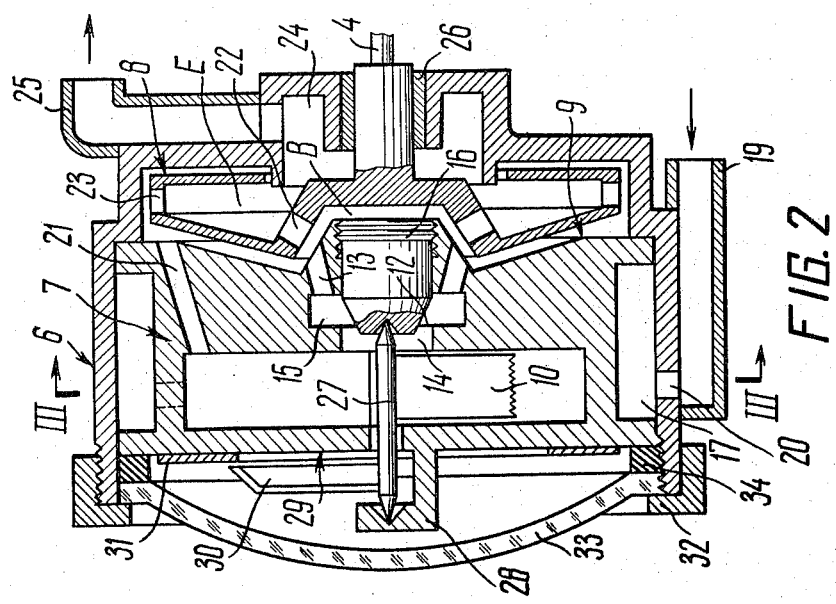

DEVICE FOR DETERMINING THE COMPOSITION OF A LIQUID-GAS MIXTURE IN THE COURSE OF MIXTURE PREPARATION

This invention relates to the field of testing and adjusting devices for preparing a mixture of two components, viz., a liquid-gas mixture, and, more specifically, to devices intended for determining the composition of liquid-gas mixtures in the course of preparing said mixtures.

The present invention can be most expediently employed for determining the composition of a fuel mixture prepared by internal combustion engine carburetors from air and liquid fuel.

Devices are known which make it possible to determine the composition of fuel mixtures by direct or indirect measurements.

In devices for measuring directly the composition of fuel mixtures, provision is made for metering orifices or nozzles and for a micromanometer or a differential manometer to measure air flow, while fuel flow in said devices is determined by means of flowmeters, flow-measuring probes or scales.

Hence, in prior art devices the problem of fuel mixture composition determination resolves itself to measuring the flow of air and fuel per unit time, followed by subjecting the data thus obtained to mathematical treatment. The composition of a fuel mixture is generally expressed in terms of the air excess ratio, $\alpha$, or as the percentage of fuel in the fuel-air mixture.

Said prior art devices suffer from the drawback of involving laborious measurements and calculations, so that the efficiency of said devices is low, which factor precludes the extensive use of said devices under actual service conditions calling for prompt evaluation of carburetor serviceability.

The group of devices based on indirect measurements embraces diverse gas analyzers employed for determining the composition of fuel mixtures by analyzing quantitatively exhaust gases. It is common practice to measure the content of carbon monoxide in the exhaust gases of carburetor engines and thereupon to determine the composition of the fuel mixture under test by means of conversion tables and charts.

The accuracy of indirect determinations is markedly affected by side factors such as, for example, engine serviceability, ignition system adjustment, the accuracy of gas analyzer readings, etc., said factors being responsible for failure of indirect fuel mixture composition measurements to provide an objective assessment of carburetor serviceability.

The common disadvantage inherent in all the known devices for determining the composition of fuel-gas mixtures manifests itself in the inability of said devices to directly determine the composition of fuel-air mixtures without resorting to subsequent calculations or to conversion tables, said disadvantage being responsible for difficulties associated with the employment of said devices for assessing the performance of fuel-air mixture preparing devices under actual service conditions.

It is an object of the present invention to provide a device which makes it possible to determine any instantaneous values of liquid-gas ratios in the course of liquid-gas mixture preparation.

It is a further object of the present invention to provide a device noted for its maximum versatility as well as for operation simplicity in the course of testing liquid-gas mixing units under service conditions.

For the attainment of said objects, there is provided a device for determining the composition of liquid-air mixtures in the course of liquid-air mixture preparation which comprises a gas flow meter disposed in a gas stream directed to the liquid-air mixing unit under test.

The device, according to the invention, comprises a mixture composition indicator proper, which indicator is a chamber having the form of a body of rotation and accommodating along the axis thereof a movable and a fixed radial partition dividing said chamber into two cavities, one of said cavities communicating with a liquid stream directed to the liquid-air mixing unit under test, while the other cavity is in communicative relation with the working chamber of a centrifugal pump, the impeller of said centrifugal pump being driven by a gas flow sensing element, so that there sets on a circulating liquid stream having a flow rate proportional to the flow of gas through the gas flow sensing element.

It is preferred that the chamber be cylindrical in shape and be mounted coaxially with the centrifugal pump impeller in a common casing, the working chamber of said pump being confined by the walls of said common casing and the end wall of said chamber and communicating with said chamber via a throttle made in said end wall along the axis of said chamber and divided by radial partitions into two sections so that said liquid streams passing through said sections would set the movable partition and an indicator pointer affixed thereto in a position corresponding to the instantaneous value of the liquid-to-gas flow ratio.

The throttle may have the shape of an annular slit formed by the line of intersection of an axial through channel in the chamber end wall with a coaxial annular bore of a greater diameter and the tapered surface of an adjusting screw mounted in said channel from the side of the centrifugal pump working chamber.

The movable radial partition should preferably be disposed on a pivot shaft freely mounted in centers, of which one center is secured in the adjusting screw end, and the other, on a bracket located outside the chamber, provision being made on the end of said shaft protruding outwardly for a mixture composition indicator pointer which travels against a scale affixed to the end wall of the chamber.

A device designed along the aforementioned lines makes it possible to determine the liquid-to-air flow ratio directly from the readings of a single instrument or, in other words, to obtain instantaneous values of a liquid-gas mixture composition in the course of mixture preparation without resorting to any additional measurements or calculations, this being essential for prompt evaluation of performance characteristics of liquid-air mixing units.

The availability of an adjusting screw in the present device is useful in that it provides the possibility of calibrating the device in the course of device manufacture and alignment, as well as of adjusting the device for operating in any pre-set range of liquid-gas ratios.

The present invention is illustrated hereinbelow by the description of an exemplary embodiment thereof with reference to the accompanying drawings wherein:

FIG. 2 shows the assembly A of FIG. 1 in longitudinal section, and

FIG. 3 is the cross-sectional view of the assembly A of FIG. 2 taken along line III—III.

Figure 1:
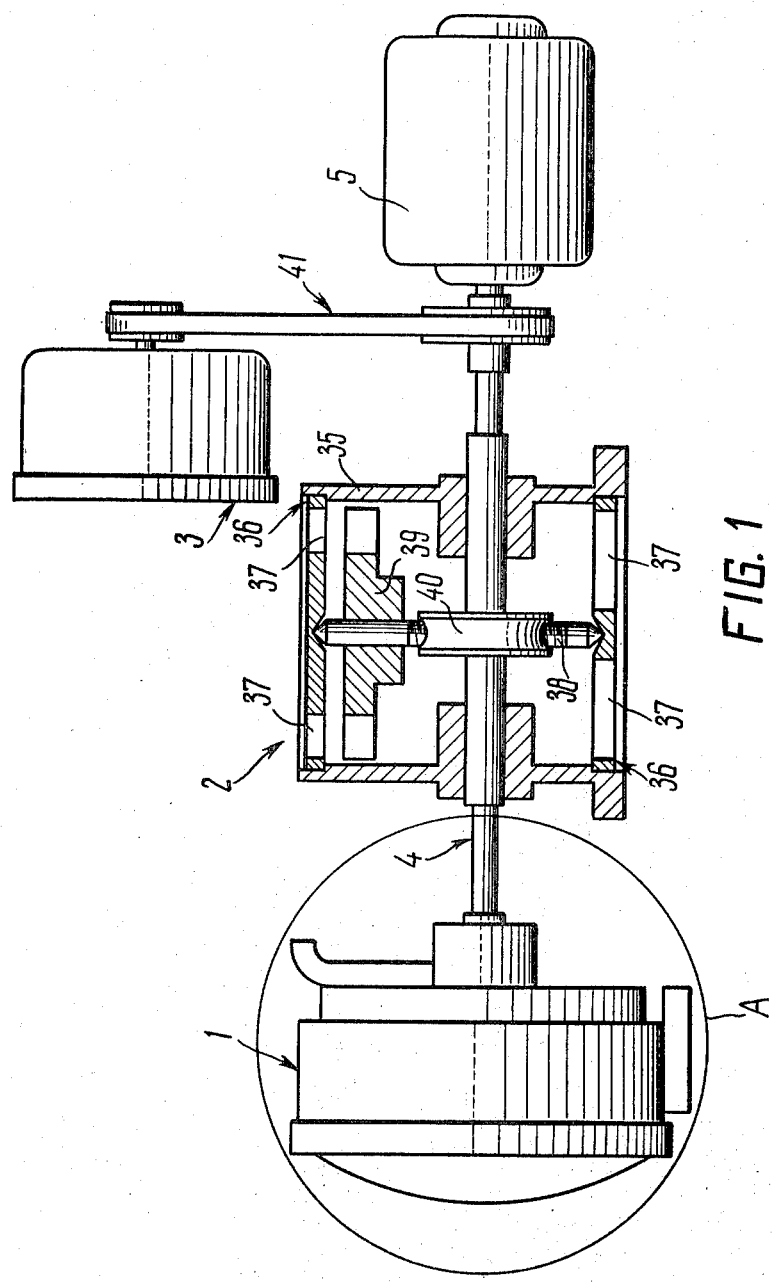
FIG. 1 is a partially cut-away side view of the device for determining the composition of fuel mixtures.

The present device in intended for determining the composition of fuel mixtures prepared by internal combustion engine carburetors.

The device, according to the invention, comprises three principal instruments: a fuel mixture composition indicator 1 proper (FIG. 1); an air flow sensing element 2, and an air flow indicator 3 interconnected by means of a common shaft 4. To compensate for the moment of inertia in the rotating components of the device, a midget electric motor 5 is mounted on said shaft 4.

The fuel mixture composition indicator 1 comprises a hermetic cylindrical casing 6 (FIG. 2), which accommodates a cylindrical chamber 7 and a centrifugal pump impeller 8 disposed coaxially in relation to said chamber 7. The working chamber "B" of the centrifugal pump is confined by the end wall 9 of the chamber 7 and the walls of impeller 8.

The chamber 7 is divided by a radial movable partition 10 (FIG. 3) and a radial fixed partition 11 into two cavities "C" and "D".

The liquid fuel stream directed to the carburetor under examination from a fuel tank (not shown) flows via the cavity "C", while in the cavity "D" there circulates a liquid fuel stream which is proportional to the gas stream passing through the gas flow sensing element 2 and is produced by the centrifugal pump whose impeller 8 is mounted on the shaft 4 of the gas flow sensing element 2.

The cavities "C" and "D" of the chamber 7 communicate with the inlet of the centrifugal pump working chamber "B" by means of a common throttle 12 (FIG. 2) and channels 13 made in the rear end wall 9 of the chamber 7.

The throttle 12 is shaped as an annular slit formed by the line of intersection of an axial channel 14 with a coaxial annular bore 15 having a greater diameter and the tapered surface of an adjusting screw 16 mounted in said channel 14 from the side of the centrifugal pump working chamber "C".

The throttle 12 is divided by the movable partition 10 and the fixed partition 11 into sections "c" and "d", the flow area of said sections being proportional to the liquid streams passing through the cavities "C" and "D" of the chamber 7, respectively.

The width of the throttle 12 can be regulated by screwing in or out adjusting screw 16.

The annular bore 15 communicates with the inlet of the centrifugal pump working chamber "B" through the channels 13 which are uniformly spaced on the circumference of said bore 15.

On the lateral surface of the chamber 7 provision is made for an external annular bore 17, which communicates with the cavity "C" of the chamber 7 via a radial orifice 18, while an orifice 20 serves for connecting said annular bore 17 to an inlet union 19 of the casing 6.

The cavity "D" of the chamber 7 communicates via channel 21 in the rear end wall 9 with the outlet of the centrifugal pump working chamber "B".

The chamber "E" of the centrifugal pump impeller 8 communicates with the inlet side of the working chamber "B" of said pump by means of inlet openings 22 in the inner ring of the impeller 8, while outlet openings 23 in the outer ring of said impeller 8 serve to connect the chamber "E" to the outlet side of the chamber "B". The chamber "E" of the impeller 8 further communicates with an outlet union 25 of the casing 6 via the annular bore 24 in the casing 6 of the indicator 1.

The centrifugal pump impeller 8 is mounted on a bearing 26 disposed in the casing 6 with the provision for axial displacement, thereby making it possible to adjust the clearance between the end wall 9 of the chamber 7 and the impeller 8.

The movable radial partition 10 is located in the chamber 7 with a minimum clearance between the edges of said partition and the inner walls of the chamber 7 in order to insure free rotative motion of said partition 10 in said chamber 7.

The movable partition 10 is mounted on a pivot shaft 27, which passes through the axis of the chamber 7 and freely rotates on centers, of which one center is secured in the end of the adjusting screw 16, and the other center in a bracket 28 mounted on a front end wall 29 of the chamber 7, provision being made in said wall 29 for an axial through opening which freely accommodates said shaft 27. Adjustment of the throttle 12 by screw 16 can be effected by any suitable adjustment of the centers as is well known in the art.

Affixed to the end of the shaft 27 protruding from the chamber 7 is a pointer 30, which moves over a circular scale 31 mounted externally on the front end wall 29 of the chamber 7. The scale 31 of the fuel mixture composition indicator 1 is graduated to read either air excess ratio values, $\alpha$, or fuel percentage in the fuel-air mixture under test.

The scale 31 is enclosed within a cover 32 screwed onto the casing 6, provision being made in the cover 32 for a glass 33 furnished with a sealing gasket 34.

The centrifugal pump impeller 8 is mounted on the shaft 4 of the air flow sensing element 2 (FIG. 2).

Said sensing element 2 comprises a cylindrical body 35 having end bearings 36 with ports 37 for the passage of air required for carburetor operation.

Mounted in said bearings 36 is a worm shaft 38, whose one end carries a vane 39 set in rotation by the stream of air passing through the air flow sensing element 2. The worm shaft 38 meshes with a worm wheel 40 mounted on the shaft 4, one end of said shaft 4 being linked via a belt drive 41 to the air flow indicator 3 comprising a conventional tachometer, while the other end of said shaft 4 carries the centrifugal pump impeller 8 housed in the casing 6 of the fuel mixture composition indicator 1.

The present device for determining the composition of fuel-air mixtures functions in the following manner.

Prior to the commencement of operation, the air flow sensing element 2 is connected to the air line of the carburetor to be tested, and the fuel mixture composition indicator 1 is interposed between a fuel feed pump and the inlet union of the carburetor so that the fuel line from the fuel pump is coupled to the inlet union 19 of the casing 6 of the indicator 1, whereas the outlet union 25 of said casing 6 is connected to the carburetor fuel feed line.

In the starting position of the present device, the mixture composition indicator 1 contains no fuel and the indicator pointer 30 can be in any position relative to the scale.

A fuel stream directed to the carburetor being tested passes through the fuel mixture composition indicator 1 in the following sequence. The fuel stream flows via the inlet union 19 and the orifice 20 of the casing 6 into the bore 17 of the chamber 7 and thence, via the radial channel 18, to the cavity "C" of the chamber 7. From the cavity "C" of the chamber 7, the fuel flows through the section "c" of the throttle 12, the bore 15, and the channels 13 in the end wall 9 of the chamber 7, whereupon it enters the inlet side of the working chamber "B" of the centrifugal pump, passes through the inlet openings 22 of the centrifugal pump impeller 8 into the inner chamber "E" of the impeller 8. Next the fuel flows through the bore 24 in the casing 6 and the outlet union 25 into the fuel line, which directs it to the carburetor being tested.

While leaving the cavity "C" of the chamber 7 via the section "c" of the annular slit in the throttle 12, said liquid fuel stream undergoes throttling and, hence, exerts pressure on the movable partition 10, which pressure tends to rotate said partition 10 counter-clockwise (FIG. 3).

The air directed to the carburetor under test passes through the air flow sensing element 2 and sets in rotation the vane 39 of said sensing element 2 whereupon said vane 39, via the worm shaft 38, the worm wheel 40 and the shaft 4 linked to said worm wheel 4, sets in rotation the centrifugal pump impeller 8.

Said impeller 8 rotates at a rate proportional to the air stream sucked in by the carburetor and produces within the casing 6 of the fuel mixture composition indicator 1 a circulating liquid fuel stream, which is proportional to the air stream.

Liquid fuel stream circulation proceeds as follows.

From the chamber "E" of the centrifugal pump impeller 8, said liquid fuel stream is thrown by the rotating impeller 8 to the periphery thereof and travels via the outlet openings 23 of the impeller 8 and the channel 21 in the rear end wall 9 of the chamber 7 to the cavity "D" of the chamber 7 and thence, through the section "d" of the throttle 12 and the channels 13, to the inlet openings 22 of the impeller 8, so that said fluid stream returns to the chamber "E" of said impeller 8 and flows in a closed cycle.

As the circulating fuel stream flows through the respective section "d" of the throttle 12, it exerts pressure on the movable partition 10 of the chamber 7, so that said partition 10 tends to rotate clockwise (FIG. 3).

The fact that said partition 10 is mounted on the pivot shaft 27 necessitates pressure equality on both sides of said partition 10 and, hence, the equality of fuel flow rate over the entire perimeter of the annular slit of the throttle 12 for said partition 10 immobilization.

Once a fluid stream increases, the pressure exerted on the side of the movable partition 10 that adjoins said fluid stream will also increase and cause said partition 10 to rotate towards the second fluid stream, thereby increasing the area of the throttle 12 section that corresponds to the increased fluid stream.

The resulting redistribution of the sections "c" and "d" of the throttle 12 brings about pressure equalization on both sides of the movable partition 10.

Pressure equality on both sides of the movable partition 10 involves the equality of fuel flow rate over the entire perimeter of the annular slit of the throttle 12.

Inasmuch as one liquid fuel stream in the present device equals the rate of fuel flow through the carburetor, while the second liquid fuel stream is proportional to the rate of air flow through the carburetor, the position of the movable partition 10 and, hence, that of the pointer 30 defines unambiguously the liquid fuel-to-air flow ratio.

The scale 31 of the fuel mixture composition indicator 31 is graduated to read either the air excess ratio, $\alpha$, or the fuel percentage in fuel-air mixtures.

The air flow indicator 3 is adjusted to read the rate of air flow through the carburetor, thereby making it possible to determine for fuel-air mixture preparing units (carburetors) the characteristics which show the dependence of fuel-air mixture composition on the rate of fuel-air mixture flow.

The present device for determining the composition of fuel-air mixtures in the course of preparing said mixtures can be advantageously employed for evaluating the serviceability of carburetors on engine-simulating vacuum plants, engine test benches and on car checking lines (provided in the car being checked the brake drums have not been dismantled, where carburetor testing should be carried out without dismounting the carburetor from the engine. The present device is also useful for carburetor performance evaluation during running tests.

In all the instances referred to hereinabove, carburetor testing resolves itself to determining the performance characteristics of the carburetor being examined.

To ascertain the defects, test carburetor characteristics are compared with those of a reference carburetor, and the operator rectifies the defects thus determined by means of appropriate adjustments in the test carburetor in order to impart to the carburetor in question the characteristics of the reference carburetor so as to enhance engine efficiency and minimize the toxicity of exhaust gases.

What we claim is:

1. A device for determining the composition of a liquid-gas mixture in the course of mixture preparation comprising a gas flow sensing element disposed in the gas stream directed to a liquid-gas mixture preparing unit being tested; a mixture composition indicator comprising a cylindrical chamber; a movable and a fixed radial partition mounted in said chamber along the axis thereof and dividing said chamber into first and second cavities; the first cavity of said chamber receiving a liquid stream directed to said liquid-gas mixture preparing unit being tested; and a centrifugal pump provided with a working chamber and including therein an impeller driven by said gas flow sensing element; means connecting the second cavity of said chamber with the working chamber of said centrifugal pump for producing in said second cavity a circulating liquid stream proportional to the gas stream passing through said gas flow sensing element, said movable partition being subjected to the pressures of the liquid streams and undergoing movement due to differential pressures thereof, and throttling orifices for the passage of both said liquid streams whose ratio is determined by the position of the movable partition; said throttling orifices cooperatively defining an annular slit between the edge of a concentric bore provided in one of the walls of said cylindrical chamber and a tapered surface of a screw concentrically engaged in said bore.

2. A device of claim 1 comprising a liquid-gas mixture composition indicator pointer affixed to said movable partition and wherein the chamber is disposed coaxially in relation to the centrifugal pump impeller in a common casing, and the working chamber of said centrifugal pump is defined by the walls of said casing and the end wall of said chamber.

3. A device of claim 2 comprising a pivot shaft and means defining centers and wherein the movable radial partition is disposed in said chamber on said pivot shaft freely mounted in said centers, of which one center is secured in the end of said adjusting screw, while the other center is secured in a bracket mounted outside said chamber, the end of said shaft protruding from said chamber being furnished with the pointer of the liquid-gas mixture composition indicator, said pointer moving over a scale affixed to the other end wall of said chamber.

* * * * *